(12) United States Patent
Han et al.

(10) Patent No.: US 11,966,589 B2
(45) Date of Patent: Apr. 23, 2024

(54) CONTROLLER AND OPERATING METHOD THEREOF

(71) Applicant: SK hynix Inc., Gyeonggi-do (KR)

(72) Inventors: Hyo Byung Han, Gyeonggi-do (KR); Jin Woo Kim, Gyeonggi-do (KR); Jin Won Jang, Gyeonggi-do (KR); Young Wu Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 205 days.

(21) Appl. No.: 17/563,940

(22) Filed: Dec. 28, 2021

(65) Prior Publication Data
US 2023/0035079 A1 Feb. 2, 2023

(30) Foreign Application Priority Data

Aug. 2, 2021 (KR) .................. 10-2021-0101236

(51) Int. Cl.
*G06F 3/06* (2006.01)

(52) U.S. Cl.
CPC .......... *G06F 3/0619* (2013.01); *G06F 3/0655* (2013.01); *G06F 3/0679* (2013.01)

(58) Field of Classification Search
CPC .... G06F 3/0619; G06F 3/0655; G06F 3/0679; G06F 3/064; G06F 3/0659; G06F 3/0658; G06F 11/1048; G06F 12/0246; G06F 12/0623; G11C 16/10; G11C 16/26; G11C 29/42

See application file for complete search history.

(56) References Cited

U.S. PATENT DOCUMENTS 7,809,994 B2   10/2010  Gorobets
2017/0185478 A1 *  6/2017  Sakai .................. G06F 11/1048

FOREIGN PATENT DOCUMENTS

KR   10-1042197 B1   6/2011
KR   10-1417827 B1   7/2014

* cited by examiner

*Primary Examiner* — Hiep T Nguyen
(74) *Attorney, Agent, or Firm* — IP & T GROUP LLP

(57) ABSTRACT

An operating method of a controller that controls a memory device, comprises: generating a data chunk including user data to be programmed in a page of the memory device and an internal parity generated by performing first ECC encoding on the user data, the internal parity being generated when a size of the user data is smaller than a size of a data area of the page, generating a page chunk including the data chunk, meta data of the user data and an external parity generated by performing second ECC encoding on the meta data and the data chunk, and controlling the memory device to program the page chunk into the page.

20 Claims, 12 Drawing Sheets

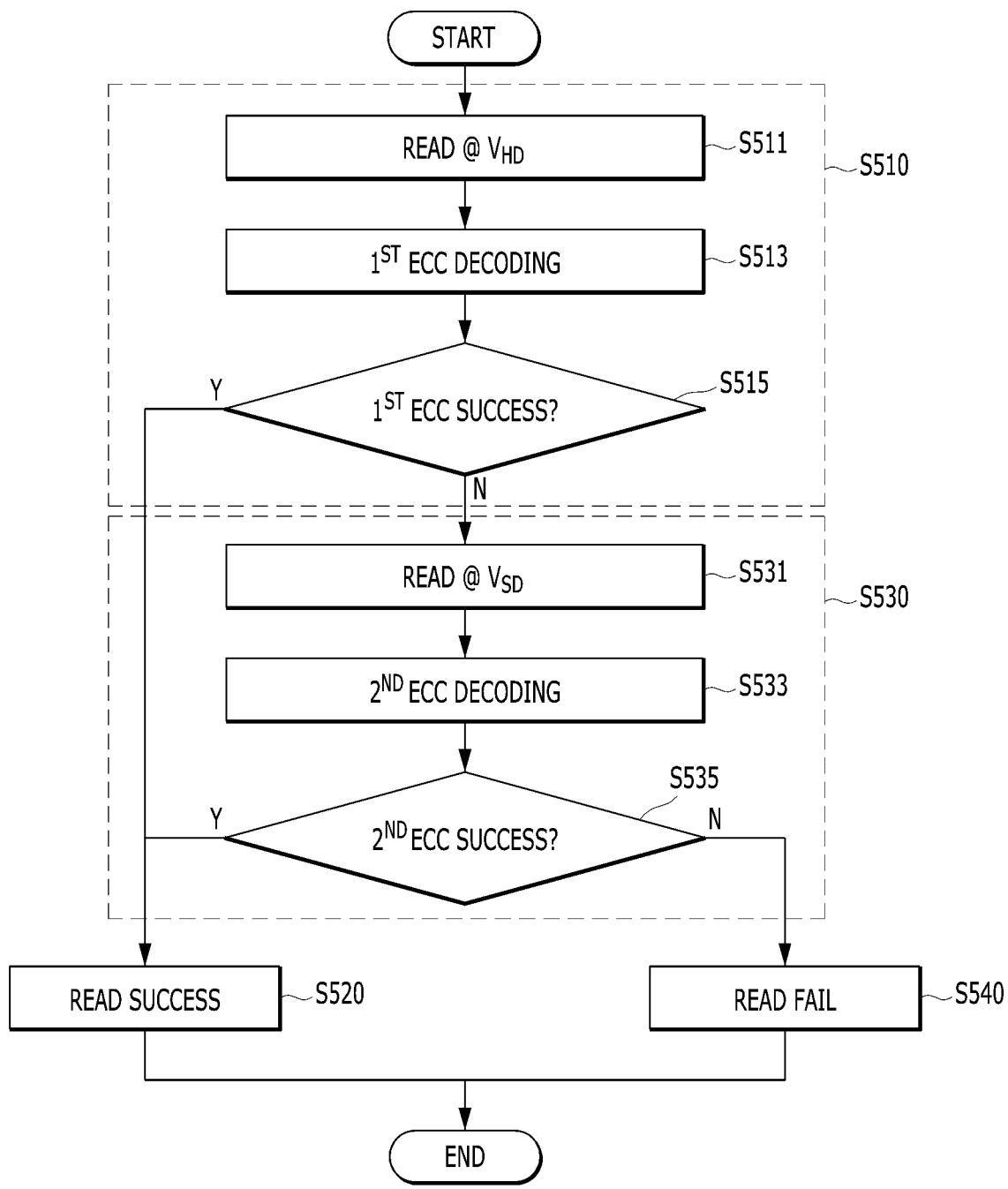

FIG. 6C

- After 1 iteration
$\underline{v} = (0 \quad 1 \quad 1 \quad 0 \quad 1 \quad 0 \quad 0 \quad 0 \quad 1 \quad 1)$ $$H \underline{v}^t = \begin{pmatrix} 1 & 1 & 1 & 1 & 0 & 0 & 0 & 0 & 0 & 0 \\ 1 & 0 & 0 & 0 & 1 & 1 & 1 & 0 & 0 & 0 \\ 0 & 1 & 0 & 0 & 1 & 0 & 0 & 1 & 1 & 0 \\ 0 & 0 & 1 & 0 & 0 & 1 & 0 & 1 & 0 & 1 \\ 0 & 0 & 0 & 1 & 0 & 0 & 1 & 0 & 1 & 1 \end{pmatrix} \begin{pmatrix} 0 \\ 1 \\ 1 \\ 0 \\ 1 \\ 0 \\ 0 \\ 0 \\ 1 \\ 1 \end{pmatrix} = \begin{pmatrix} 0 \\ 1 \\ 1 \\ 0 \\ 0 \end{pmatrix} \neq \underline{0} \longrightarrow \text{Perform next iteration}$$

Syndrome check

CONTROLLER AND OPERATING METHOD THEREOF

CROSS-REFERENCE TO RELATED APPLICATION(S)

The present application claims priority under 35 U.S.C. § 119(a) to Korean Patent Application No. 10-2021-0101236, filed on Aug. 2, 2021, the disclosure of which is incorporated herein by reference in its entirety.

BACKGROUND

1. Field

Various embodiments of the present disclosure relate to a controller of a memory device and an operating method thereof.

2. Description of the Related Art

In general, there are two types of semiconductor memory devices: volatile memory devices and non-volatile memory devices. Examples of volatile memory devices include Dynamic Random Access Memory (DRAM) and Static RAM (SRAM). Examples of non-volatile memory devices include Read Only Memory (ROM), Mask ROM (MROM), Programmable ROM (PROM), Erasable PROM (EPROM), Electrically EPROM (EEPROM), Ferromagnetic RAM (FRAM), Phase change RAM (PRAM), Magnetic RAM (MRAM), Resistive RAM (RRAM) and flash memory.

A volatile memory device loses its stored data when its power supply is interrupted, whereas a non-volatile memory device retains its stored data even without power. Non-volatile flash memory devices are widely used as storage mediums in computer systems because of their high program speed, low power consumption and large data storage capacity.

In non-volatile memory devices, especially in flash memory devices, the data state of each memory cell depends on the number of bits that the memory cell can store. A memory cell storing 1 bit of data is called a single-bit cell or a single-level cell (SLC). A memory cell storing 2 bits of data is called a multi-bit cell, a multi-level cell (MLC) or a multi-state cell. A memory cell storing 3 bits of data is called a triple-level cell (TLC). An MLC and a TLC are advantageous for high integration of a memory. However, as the number of bits programmed in each memory cell increases, the reliability decreases and the read failure rate increases.

For example, when k bits are to be programmed in a memory cell, one of $2^k$ threshold voltages is formed in the memory cell. Due to minute differences between the electrical characteristics of memory cells, the threshold voltages of memory cells programmed for the same data form threshold voltage distributions within a uniform range. Threshold voltage distributions correspond to $2^k$ data values corresponding to k-bit information, respectively.

However, a voltage window available for threshold voltage distributions is finite. Therefore, as the value "k" increases, the distance between the threshold voltage distributions decreases and the neighbouring threshold voltage distributions may overlap. As the neighbouring threshold voltage distributions overlap, read data may include a number of error bits, for example, several error bits or tens of error bits.

FIG. 1 is a threshold voltage distribution schematically illustrating program and erase states of a triple-level cell (TLC) non-volatile memory device.

FIG. 2 is a threshold voltage distribution schematically illustrating program and erase states due to characteristic deterioration of the TLC non-volatile memory device.

When 3 bits (i.e., k=3) are programmed into a single memory cell of a TLC non-volatile memory device, for example, a TLC flash memory, one of $2^3$ threshold voltage distributions, that is, 8 threshold voltage distributions, is formed in the memory cell.

Threshold voltages of memory cells programmed for the same data form a threshold voltage distribution within a uniform range due to characteristic differences between memory cells. In a TLC non-volatile memory device having 3 bits, as illustrated in FIG. 1, threshold voltage distributions are formed corresponding to the data states including 7 program states "P1" to "P7", and a threshold voltage distribution is formed corresponding to the data state including one erase state "E". FIG. 1 shows an ideal case in which threshold voltage distributions do not overlap and have sufficient read voltage margins within a uniform range therebetween.

Referring to the flash memory example of FIG. 2, a memory cell may experience charge loss in which electrons trapped at a floating gate or tunnel oxide film are discharged over time. Such charge loss may accelerate when the tunnel oxide film deteriorates by repeated program and erase operations. Charge loss results in a decrease in the threshold voltages of memory cells. For example, as illustrated in FIG. 2, the threshold voltage distribution may be shifted left due to charge loss.

Further, program disturbance, erase disturbance and/or back pattern dependency may cause increases in threshold voltages. As characteristics of memory cells deteriorate, neighbouring threshold voltage distributions of the data states "E" and "P1" to "P7" may overlap, as illustrated in FIG. 2.

When threshold voltage distributions overlap each other, read data may include a number of errors. For example, when a third read voltage Vread3 is applied and a memory cell is in an on-state, it is determined that the memory cell has the second program state P2, and when the memory cell is in an off-state, it is determined that the memory cell has the third program state P3. However, when the third read voltage Vread3 is applied in a period where the second program state P2 and the third program state P3 overlap each other, the memory cell may be read as being in the on-state even though it is in the off-state. Accordingly, as the threshold voltage distributions overlap each other, the read data may include a number of error bits.

What is therefore required is a method for precisely reading data stored in memory cells of a semiconductor memory device.

SUMMARY

Various embodiments of the present disclosure are directed to a controller and an operating method thereof, which may accurately read data stored in a memory cell.

In accordance with an embodiment of the present invention, an operating method of a controller that controls a memory device, the operating method may include: generating a data chunk including user data to be programmed in a page of the memory device and an internal parity generated by performing first ECC encoding on the user data, the internal parity being generated when a size of the user data is smaller than a size of a data area of the page; generating a page chunk including the data chunk, meta data of the user data and an external parity generated by performing second ECC encoding on the meta data and the data chunk; and controlling the memory device to program the page chunk into the page.

In accordance with an embodiment of the present invention, a controller that controls a memory device, the controller may include: an ECC encoder configured to: generate a data chunk including user data to be programmed in a page of the memory device and an internal parity generated by performing first ECC encoding on the user data, the internal parity being generated when a size of the user data is smaller than a size of the data area of the page, and generate a page chunk including the data chunk, meta data of the user data and an external parity generated by performing second ECC encoding on the meta data and the data chunk; and a processor configured to control the memory device to program the page chunk into the page.

In accordance with an embodiment of the present invention, an operating method of a controller, the operating method may include: generating a data packet comprising a data chunk and metadata, the data chunk being full of user data and a first parity for the user data and the metadata locating the user data within the data chunk; generating a page chunk comprising the data packet and a second parity for the data packet to control a memory device to store the page chunk into a page therein; and obtaining the user data from a page chunk readout from the page by error-correcting readout user data through a readout first parity when error-correcting fails on a readout data packet through a readout second parity. The readout page chunk may include the readout data packet and the readout second parity. The readout data packet may include readout metadata and the readout data chunk full of the readout user data and the readout first parity.

BRIEF DESCRIPTION OF THE DRAWINGS

FIG. 5 is a flowchart illustrating an operation of a memory controller illustrated in FIG. 4A in accordance with an embodiment of the present disclosure.

FIG. 6C is a diagram illustrating a syndrome check process according to LDPC decoding in accordance with an embodiment of the present disclosure.

DETAILED DESCRIPTION

Figure 1:
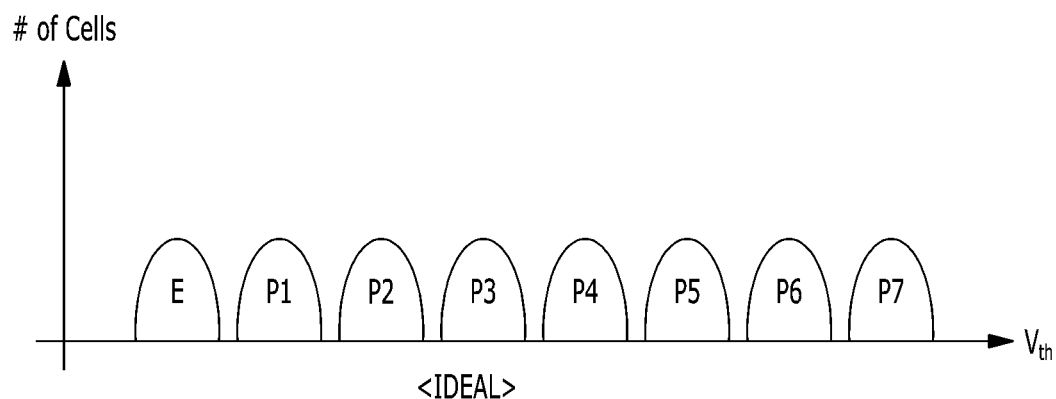
FIG. 1 is a threshold voltage distribution graph illustrating program and erase states of a 3-bit multi-level cell (MLC) non-volatile memory device.

Various embodiments of the present disclosure are described below with reference to the accompanying drawings. Elements and features of the disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., a field programmable gate array (FPGA) or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in the disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

In accordance with an embodiment of the present invention, an operating method of a controller that controls a memory device, may include: generating a data chunk including user data to be programmed in a page of the memory device and an internal parity generated by performing first ECC encoding on the user data, when a size of the user data is smaller than a size of a data area of the page; generating a page chunk including an external parity generated by performing second ECC encoding on meta data of the user data and the data chunk, the meta data and the data chunk; and controlling the memory device to program the page chunk into the page.

The operating method may further comprise generating the meta data including location information indicating a location of the user data in the data area.

The operating method may further include: controlling the memory device to read the page chunk from the page; performing first ECC decoding on the data chunk and the meta data by using the external parity included in the page chunk; and obtaining the user data from the data chunk on the basis of the location information included in the meta data when the first ECC decoding succeeds.

The operating method may further include storing map data, which maps a physical address of the location where the user data is stored and a logical address of the user data, in a memory included in the controller.

The operating method may further include: controlling the memory device to read the page chunk from the page; performing first ECC decoding on the data chunk and the meta data by using the external parity included in the page chunk; identifying the user data and the internal parity in the data chunk by referring to the map data associated with the page in the memory when the first ECC decoding fails; and performing second ECC decoding on the user data by using the internal parity.

The operating method may further include determining that a read operation on the page has failed when the data chunk has no internal parity as a result of identifying the user data and the internal parity in the data chunk.

The operating method may further include, when there is no map data associated with the page in the memory, repeatedly performing the second ECC decoding on any combination of the user data and the internal parity in the data chunk until the second ECC decoding succeeds or on all possible combinations until the second ECC decoding fails.

The generating of the data chunk to be stored in the data area may include: determining an encoding rate of the first ECC encoding according to the size of the user data; and generating the internal parity by performing the first ECC encoding on the user data according to the determined encoding rate.

The generating of the data chunk to be stored in the data area may further include scrambling the user data before generating the internal parity.

The operating method may further include determining the user data as the data chunk to be stored in the data area when the size of the user data is the same as the size of the data area of the page.

In accordance with an embodiment of the present invention, a controller that controls a memory device, may include: an ECC encoder configured to generate a data chunk including user data to be programmed in a page of the memory device and an internal parity generated by performing first ECC encoding on the user data when a size of the user data is smaller than a size of a data area of the page, and generate a page chunk including an external parity generated by performing second ECC encoding on meta data of the user data and the data chunk, the meta data and the data chunk; and a processor configured to control the memory device to program the page chunk into the page.

The processor may generate the meta data including location information indicating a location of the user data in the data area.

The processor may control the memory device to read the page chunk from the page. The controller may further include an ECC decoder configured to perform first ECC decoding on the data chunk and the meta data by using the external parity included in the page chunk. The processor may obtain the user data from the data chunk on the basis of the location information included in the meta data when the first ECC decoding succeeds.

The controller may further include a memory configured to store map data which maps a physical address of the location where the user data is stored and a logical address of the user data.

The processor may control the memory device to read the page chunk from the page. The controller may further include an ECC decoder configured to perform first ECC decoding on the data chunk and the meta data by using the external parity included in the page chunk, identify the user data and the internal parity in the data chunk by referring to the map data associated with the page in the memory when the first ECC decoding fails, and perform second ECC decoding on the user data by using the internal parity.

The processor may determine that a read operation on the page has failed when the data chunk has no internal parity as a result of identifying the user data and the internal parity in the data chunk.

When there is no map data associated with the page in the memory, the ECC decoder may repeatedly perform the second ECC decoding on any combination of the user data and the internal parity in the data chunk until the second ECC decoding succeeds or on all possible combinations until the second ECC decoding fails.

The ECC encoder may generate the data chunk by determining an encoding rate of the first ECC encoding according to the size of the user data, and generating the internal parity by performing the first ECC encoding on the user data according to the determined encoding rate.

The controller may further include a scrambler configured to scramble the user data before the ECC encoder generates the internal parity.

The processor may determine the user data as the data chunk to be stored in the data area when the size of the user data is the same as the size of the data area of the page.

Hereinafter, various embodiments of the present invention are described in detail with reference to the attached drawings.

Figure 3:
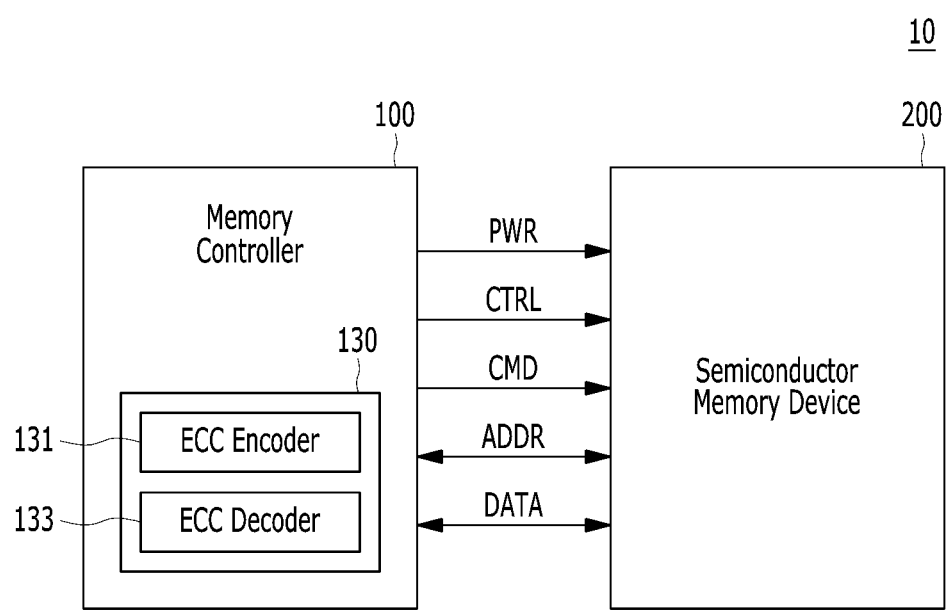
FIG. 3 is a block diagram illustrating a semiconductor memory system in accordance with an embodiment of the present disclosure.

FIG. 3 is a block diagram illustrating a semiconductor memory system 10 in accordance with an embodiment of the present disclosure.

Figure 4A:
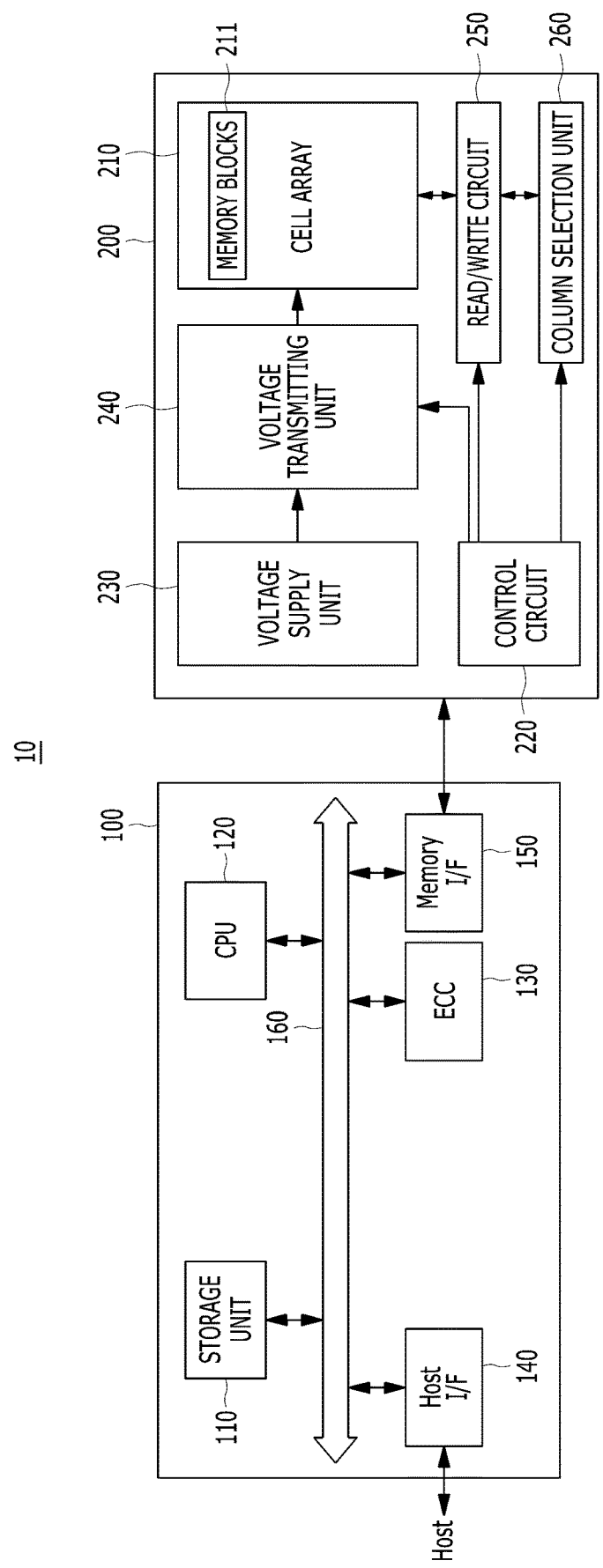
FIG. 4A is a detailed block diagram illustrating the semiconductor memory system illustrated in FIG. 3 in accordance with an embodiment of the present disclosure.
Figure 4B:
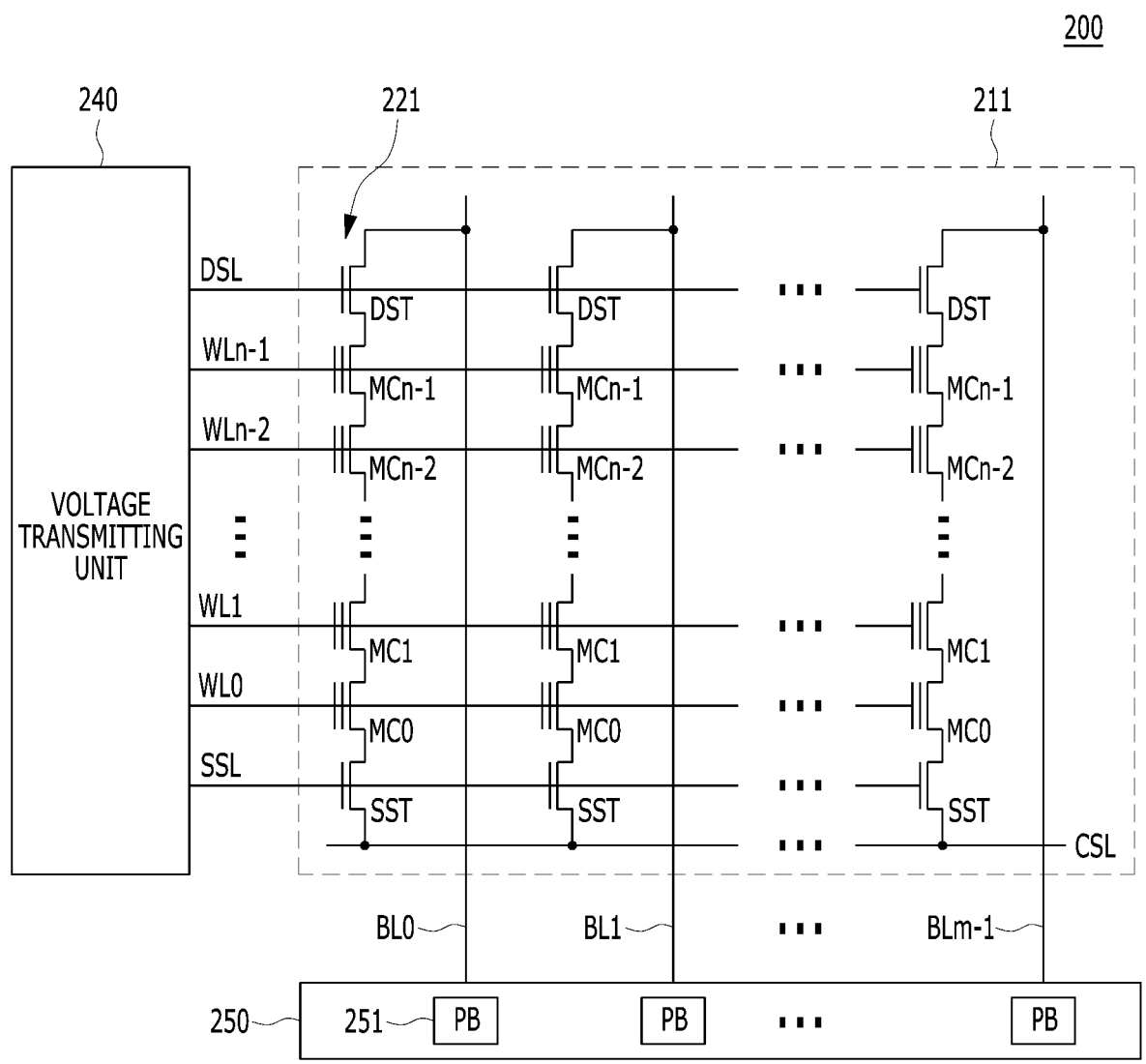
FIG. 4B is a block diagram illustrating a memory block illustrated in FIG. 4A in accordance with an embodiment of the present disclosure.

FIG. 4A is a detailed block diagram illustrating the semiconductor memory system 10 illustrated in FIG. 3 in accordance with an embodiment of the present disclosure. FIG. 4B is a block diagram illustrating a memory block 211 illustrated in FIG. 4A in accordance with an embodiment of the present disclosure.

FIG. 5 is a flowchart illustrating an operation of a memory controller 100 included in the semiconductor memory system 10 in accordance with an embodiment of the present disclosure.

Referring to FIGS. 3 to 5, the semiconductor memory system 10 may include a semiconductor memory device 200 and the memory controller 100.

The semiconductor memory device 200 may perform erase, program and read operations under the control of the memory controller 100. The semiconductor memory device 200 may receive a command CMD, an address ADDR and data DATA from the memory controller 100 through an input/output line. Also, the semiconductor memory device 200 may receive power PWR from the memory controller 100 through a power line, and receive a control signal CTRL from the memory controller 100 through a control line. The control signal CTRL may include a command latch enable CLE signal, an address latch enable ALE signal, a chip enable nCE signal, a write enable nWE signal and a read enable nRE signal.

The memory controller 100 may control overall operation of the semiconductor memory device 200. For example, in order to store data received from a host in the semiconductor memory device 200, the memory controller 100 may perform a mapping operation of connecting a file system used by the host to a storage space of the semiconductor memory device 200. For example, an address of data according to the file system used by the host may be referred to as a logical address, and an address of data in the storage space of the semiconductor memory device 200 may be referred to as a physical address. The memory controller 100 may map the logical address and the physical address.

In addition, the memory controller 100 may include an ECC unit 130 that corrects error bits. The ECC unit 130 may include an ECC encoder 131 and an ECC decoder 133.

The ECC encoder 131 may perform error correction encoding on data to be programmed into the semiconductor memory device 200, and generate data with a parity bit. The data with the parity bit may be stored in the semiconductor memory device 200.

The ECC decoder 133 may perform error correction decoding on data read from the semiconductor memory device 200. The ECC decoder 133 may determine whether error correction decoding succeeds, and output an indication signal according to the determination result. The ECC decoder 133 may correct error bits of the data by using the parity bit generated in a low density parity check (LDPC) encoding process.

When the number of error bits is equal to or greater than a correctable error bit limit, the ECC unit 130 may not correct the error bits. In this case, an error correction fail signal may be generated.

The ECC unit 130 may perform error correction using an LDPC code. Examples of the ECC unit 130 may include all circuits, systems or devices for the error correction. The LDPC code includes a binary LDPC code and a non-binary LDPC code.

According to an embodiment, the ECC unit 130 may perform error correction using hard decision data and soft decision data.

The memory controller 100 and the semiconductor memory device 200 may be integrated into a single semiconductor memory device. For example, the memory controller 100 and the semiconductor memory device 200 may be integrated into a single semiconductor memory device to constitute a solid state drive (SSD). The SSD may include a storage device configured to store data in a semiconductor memory. When the semiconductor memory system 10 is used as the SSD, the operating speed of the host connected to the semiconductor memory system 10 may be remarkably improved.

The memory controller 100 and the semiconductor memory device 200 may be integrated into a single semiconductor memory device to constitute a memory card, such as a personal computer memory card international association (PCMCIA) card, a compact flash (CF) card, a smart media (SM) card (SMC), a memory stick, multimedia cards (MMC) including reduced size MMC (RS-MMC) and micro-MMC, secure digital (SD) cards including mini-SD card, micro-SD card and SDHC card, or universal flash storage (UFS) device.

Non-limiting application examples of the semiconductor memory system 10 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

Referring to FIG. 4A, the memory controller 100 may include a storage unit 110, a CPU 120, the ECC unit 130, a host interface 140, a memory interface 150 and a system bus 160.

The host interface 140 may communicate with the host through at least one of various communication standards or interfaces, such as universal serial bus (USB), multi-media card (MMC), peripheral component interconnection express (PCIe), serial attached SCSI (SAS), serial advanced technology attachment (SATA), parallel advanced technology attachment (PATA), small computer system interface (SCSI), enhanced small disk interface (ESDI) and integrated drive electronics (IDE).

The CPU 120 may control overall operation of the semiconductor memory system 10. The CPU 120 may drive firmware to control the overall operation of the semiconductor memory system 10. The firmware may be referred to as a flash translation layer (FTL).

The CPU 120 may drive the FTL, and perform a foreground operation corresponding to a request received from the host. For example, the CPU 120 may control a write operation of the semiconductor memory device 200 in response to a write request of the host, and control a read operation of the semiconductor memory device 200 in response to a read request of the host.

In addition, the CPU 120 may perform a background operation on the semiconductor memory device 200. For example, the background operation on the semiconductor memory device 200 may include a garbage collection (GC) operation, a wear leveling (WL) operation, a map flush operation and a bad block management operation.

The storage unit 110 may serve as an operating memory of the semiconductor memory system 10 and the memory controller 100, and store data for driving the semiconductor memory system 10 and the memory controller 100. The memory controller 100 may control the semiconductor memory device 200 so that the semiconductor memory device 200 performs the read, program and erase operations in response to requests of the host. The memory controller 100 may provide the host with data read from the semiconductor memory device 200, and store the data, provided from the host, in the semiconductor memory device 200. The storage unit 110 may store data necessary for the memory controller 100 and the semiconductor memory device 200 to perform these operations.

The storage unit 110 may be implemented with a volatile memory. For example, the storage unit 110 may be implemented as a static random access memory (SRAM) or a dynamic random access memory (DRAM). The storage unit 110 may be disposed within or out of the memory controller 100. FIG. 4A illustrates the storage unit 110 disposed within the memory controller 100. In an embodiment, the storage unit 110 may be implemented as an external volatile memory and have a memory interface inputting/outputting data to/from the memory controller 100.

The memory interface 150 may serve as a memory/storage interface for interfacing between the memory controller 100 and the semiconductor memory device 200 so that the memory controller 100 controls the semiconductor memory device 200 in response to a request of the host. When the semiconductor memory device 200 is a flash memory, in particular, a NAND flash memory, the memory interface 150 may generate a control signal for the semiconductor memory device 200, and process data, which is provided to the semiconductor memory device 200, under the control of the CPU 120. The memory interface 150 may operate as an interface for processing commands and data between the memory controller 100 and the semiconductor memory device 200, for example, a NAND flash interface.

As described above, the ECC unit 130 may detect and correct an error included in data read from the semiconductor memory device 200. The memory interface 150 may interface with the semiconductor memory device 200. FIG. 4A illustrates an embodiment in which the ECC unit 130 includes both of the ECC encoder 131 and the ECC decoder 133, however, the ECC encoder 131 and the ECC decoder 133 may be substantially implemented as separate configurations.

According to an embodiment, in a program operation, the ECC unit 130 may perform LDPC encoding on original data to be programmed into the semiconductor memory device 200. In this case, in a read operation, the ECC unit 130 performs LDPC decoding on encoded data, that is, a codeword, programmed into the semiconductor memory device 200.

The ECC unit 130 may decode the encoded data, that is, the codeword, stored in the semiconductor memory device, thereby restoring the data to original data before the data is encoded.

As described below with reference to FIG. 5, a read operation on data stored in the semiconductor memory device 200 may include a hard decision read operation in operation S511 and a soft decision read operation in operation S531. The hard decision read operation is an operation of reading data from the semiconductor memory device 200 by using a hard decision read voltage VHD. The soft decision read operation is an operation of reading data from the semiconductor memory device 200 by using a soft decision read voltage VSD having a different level from the hard decision read voltage VHD. For example, in memory cells read using the hard decision read voltages VHD, the soft decision read operation may be additionally performed using the soft decision read voltage VSD.

The encoded data, that is, the codeword, read from the semiconductor memory device 200 through the hard decision read operation may be decoded into the original data by the ECC unit 130.

The soft decision read operation is not an operation of simply reading the data stored in the semiconductor memory device 200, but an operation of generating a log likelihood ratio (LLR), which is information for adding reliability to data read through the hard decision read operation, by using the soft decision read voltage VSD.

The LLR may be LDPC-decoded by the ECC unit 130. The ECC unit 130 may detect and correct an error of the encoded data, that is, the codeword, read from the semiconductor memory device 200, by using the LLR.

The semiconductor memory device 200 may include a cell array 210, a control circuit 220, a voltage supply unit 230, a voltage transmitting unit 240, a read/write circuit 250 and a column selection unit 260.

The cell array 210 may include a plurality of memory blocks 211. User data may be stored in the memory blocks 211.

Referring to FIG. 4B, each of the memory blocks 211 may include a plurality of cell strings 221 connected to a plurality of bit lines BL0 to BLm−1, respectively. The cell string 221 of each column may include at least one drain selection transistor DST and at least one source selection transistor SST. A plurality of memory cells or memory cell transistors MC0 to MCn−1 may be connected in series between the drain selection transistor DST and the source selection transistor SST. Each of the memory cell transistors MC0 to MCn−1 may be implemented as an MLC that stores data information of a plurality of bits per cell. The cell strings 221 may be electrically connected to the bit lines BL0 to BLm−1, respectively.

FIG. 4B illustrates the memory block 211 formed of NAND-type flash memory cells. However, the memory block 211 of the memory device of the present disclosure is not limited to a NAND-type flash memory, but may be configured as a NOR-type flash memory, a hybrid flash memory in which at least two types of memory cells are mixed, and a One-NAND flash memory whose memory chip contains a controller. Operating characteristics of the semiconductor memory device may be applied to a charge trap flash (CTF) in which a charge storage layer is formed of an insulating layer, as well as a flash memory device in which the charge storage layer is formed of a conductive floating gate.

Referring back to FIG. 4A, the control circuit 220 may control general operations related to the program, erase and read operations of the semiconductor memory device 200.

The voltage supply unit 230 may provide word line voltages, for example, a program voltage, a read voltage and a pass voltage, to be supplied to respective word lines according to an operation mode, and a voltage to be supplied to a bulk, for example, a well region, in which memory cells are formed. A voltage generating operation of the voltage supply unit 230 may be performed under the control of the control circuit 220.

The voltage supply unit 230 may generate a plurality of variable read voltages to generate a plurality of read data.

The voltage transmitting unit 240 may select one of the memory blocks 211 of the memory cell array 210 and select one of word lines of the selected memory block, in response to the control of the control circuit 220. Memory cells connected to each of the word lines may be referred to as a page. A memory block may be a minimum unit of an erase operation, and a page may be a minimum unit of a program operation.

The voltage transmitting unit 240 may provide the selected word line and unselected word lines with the word line voltages generated by the voltage supply unit 230, in response to the control of the control circuit 220.

The read/write circuit 250 may be controlled by the control circuit 220, and operate as a sense amplifier or a write driver according to an operation mode. For example, in the case of verification/normal read operations, the read/write circuit 250 may operate as the sense amplifier for reading data from the memory cell array 210. During the normal read operation, the column selection unit 260 may output data read from the read/write circuit 250 to an external device, for example, a controller, in response to column address information. Furthermore, during the verification read operation, the data read from the read/write circuit 250 may be provided to a pass/fail verification circuit (not illustrated) included in the semiconductor memory device 200, and be used to determine whether the memory cells have been successfully programmed.

In the case of a program operation, the read/write circuit 250 may operate as the write driver that drives bit lines according to data to be stored in the cell array 210. The read/write circuit 250 may receive data to be written to the cell array 210 from a buffer (not illustrated) during the program operation, and drive the bit lines according to the inputted data. To this end, the read/write circuit 250 may include a plurality of page buffers 251 respectively corresponding to columns (or bit lines) or column pairs (or bit line pairs). A plurality of latches may be included in each of the page buffers 251.

Referring to FIGS. 4A and 5, an operating method of the memory controller 100 may include a hard decision decoding operation S510, and further include a soft decision decoding operation S530. Target data of the hard and soft decision decoding operations S510 and S530, that is, data stored in the semiconductor memory device 200, is encoded data which is LDPC-encoded by the ECC unit 130, that is, a codeword.

For example, the hard decision decoding operation S510 may be a hard decision LDPC decoding operation for hard decision read data having a predetermined length, which is read from a memory cell of the memory block 211 by using the hard decision read voltage VHD. The hard decision decoding operation S510 may include operations S511, S513 and S515.

For example, the soft decision decoding operation S530 may be a soft decision LDPC decoding operation of performing LDPC decoding by forming soft decision read data for a specific hard decision read voltage VHD when the hard decision LDPC decoding finally fails in the hard decision decoding operation S510. The soft decision decoding operation S530 may include operations S531, S533 and S535.

As described above, in operation S511, which is a hard decision read operation, hard decision read data may be read from the semiconductor memory device 200 by using the hard decision read voltages VHD. The memory controller 100 may transmit a read command and an address to the semiconductor memory device 200. The semiconductor memory device 200 may read the hard decision read data from the semiconductor memory device 200 by using the hard decision read voltages VHD, in response to the read command and the address. The hard decision read data read from the semiconductor memory device 200 may be transmitted to the memory controller 100.

In operation S513, the hard decision LDPC decoding may be performed as first LDPC decoding. The ECC unit 130 may perform the hard decision LDPC decoding on the hard decision read data, which is read from the semiconductor memory device 200 by using the hard decision read voltages VHD, by using an error correction code.

In operation S515, it is determined whether the hard decision LDPC decoding succeeds. In other words, in operation S515, it is determined whether an error of the hard decision data, which is hard decision LDPC-decoded in operation S513, is corrected. For example, the memory controller 100 may determine whether the error of the hard decision data, which is hard decision LDPC-decoded, is corrected, by using the hard decision data, which is hard decision LDPC-decoded, and a parity check matrix. For example, when an operation result of the hard decision data, which is hard decision LDPC-decoded, and the parity check matrix is a zero matrix ("0"), it may be determined that the hard decision data, which is hard decision LDPC-decoded, is correct data. On the other hand, when the operation result of the hard decision data, which is hard decision LDPC-decoded, and the parity check matrix is not a zero matrix ("0"), it may be determined that the hard decision data, which is hard decision LDPC-decoded, is not correct data.

When a result of the determination in operation S515 indicates that the hard decision LDPC decoding of operation S513 is successful, the read operation of operation S511 by using the hard decision read voltage VHD may be evaluated as successful in operation S520, and the error correction decoding may be terminated. The hard decision LDPC-decoded hard decision data of operation S513 may be outputted to the outside of the memory controller 100 or used inside the memory controller 100 as error-corrected data.

When the result of the determination in operation S515 indicates that the hard decision LDPC decoding of operation S513 fails, the soft decision decoding operation S530 may be performed.

As described above, in operation S531, which is a soft decision read operation, soft decision read data may be read from the semiconductor memory device 200 by using the soft decision read voltages VSD. For example, in memory cells read using the hard decision read voltages VHD, an additional read operation may be performed using the soft decision read voltages VSD. The soft decision read voltages VSD may have different levels from the hard decision read voltages VHD.

In operation S533, the soft decision LDPC decoding may be performed as second LDPC decoding. The soft decision LDPC decoding may be performed based on the hard decision read data and soft decision read data including data read using the soft decision read voltage VSD. The hard decision read voltage VHD and the soft decision read voltage VSD may have different levels.

Figure 2:
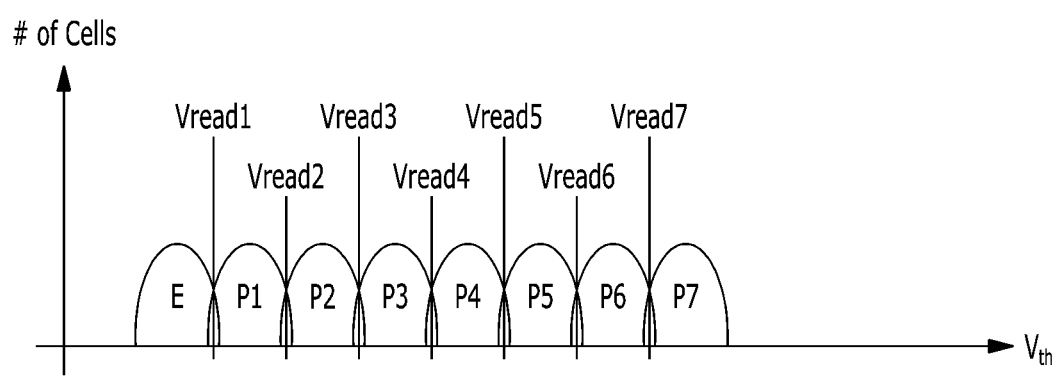
FIG. 2 is a threshold voltage distribution graph illustrating program and erase states of a TLC non-volatile memory device, which may change due to characteristic degradation of the TLC non-volatile memory device.

For example, each of the memory cells MC0 to MCn−1 of the semiconductor memory device 200 may belong to any state of the threshold voltage distributions P1 to P7 of seven program states and the threshold voltage distribution E of one erase state illustrated in FIG. 2.

Each of the hard decision read voltages VHD may have a voltage level between two adjacent logic states among the plurality of states. Each of the soft decision read voltages VSD may have a level between two adjacent logic states among the plurality of states, but may have a different level from the hard decision read voltages VHD.

A hard decision read data value read by the hard decision read voltage VHD and a soft decision read data value read by the soft decision read voltage VSD in the memory cells MC0 to MCn−1 may be different from each other. For example, among the memory cells, tail cells having a threshold voltage lower or higher than a voltage distribution of a normal logic state may be present. A data value read by the hard decision read voltage VHD and a data value read by the soft decision read voltage VSD in the tail cells may be different from each other. When an additional read operation according to the soft decision read voltage VSD is performed in addition to the read operation according to the hard decision read voltage VHD, additional information on threshold voltages of the memory cells MC0 to MCn−1, that is, LLR (e.g., information on the tail cells), which is information for adding reliability to data read through the hard decision read operation, may be obtained.

When the additional information is obtained, the probability that the data stored by the memory cells MC0 to MCn−1 is in a first state (e.g., "1") or in a second state (e.g., "0") or the accuracy of the likelihood ratio may increase. That is, the reliability of LDPC decoding may increase. The memory controller 100 may perform the soft decision LDPC decoding by using the soft decision read data read by using the hard decision read voltage VHD and the soft decision read voltage VSD. The relationship between the hard decision read voltage VHD and the soft decision read voltage VSD is described below with reference to FIGS. 7A and 7B.

In operation S535, it is determined whether the soft decision LDPC decoding succeeds. In operation S535, it is determined whether an error of the soft decision data, which is soft decision LDPC-decoded in operation S533, is corrected. For example, the memory controller 100 may determine whether the error of the soft decision data, which is soft decision LDPC-decoded, is corrected, by using the soft decision data, which is soft decision LDPC-decoded, and a parity check matrix. For example, when an operation result of the soft decision data, which is soft decision LDPC-decoded, and the parity check matrix is a zero matrix ("0"), it may be determined that the soft decision data, which is soft decision LDPC-decoded, is correct data. On the other hand, when the operation result of the soft decision data, which is soft decision LDPC-decoded, and the parity check matrix is not a zero matrix ("0"), it may be determined that the soft decision data, which is soft decision LDPC-decoded, is not correct data.

The operation of the soft decision data, which is soft decision LDPC-decoded, and the parity check matrix and the operation of the hard decision data, which is hard decision LDPC-decoded, and the parity check matrix may be performed in the same manner.

When a result of the determination in operation S535 indicates that the soft decision LDPC decoding of operation S533 is successful, the read operation of operation S531 by the soft decision read voltage VSD may be evaluated as being successful in operation S520, and the error correction decoding may be terminated. The soft decision LDPC-decoded soft decision data of operation S533 may be outputted to the outside of the memory controller 100 or used inside the memory controller 100 as error-corrected data.

When the result of the determination in operation S535 indicates that the soft decision LDPC decoding of operation S533 fails, the read operation of operation S531 by the soft decision read voltage VSD may be evaluated as a failure in operation S540, and the error correction decoding may be terminated.

Figure 6A:
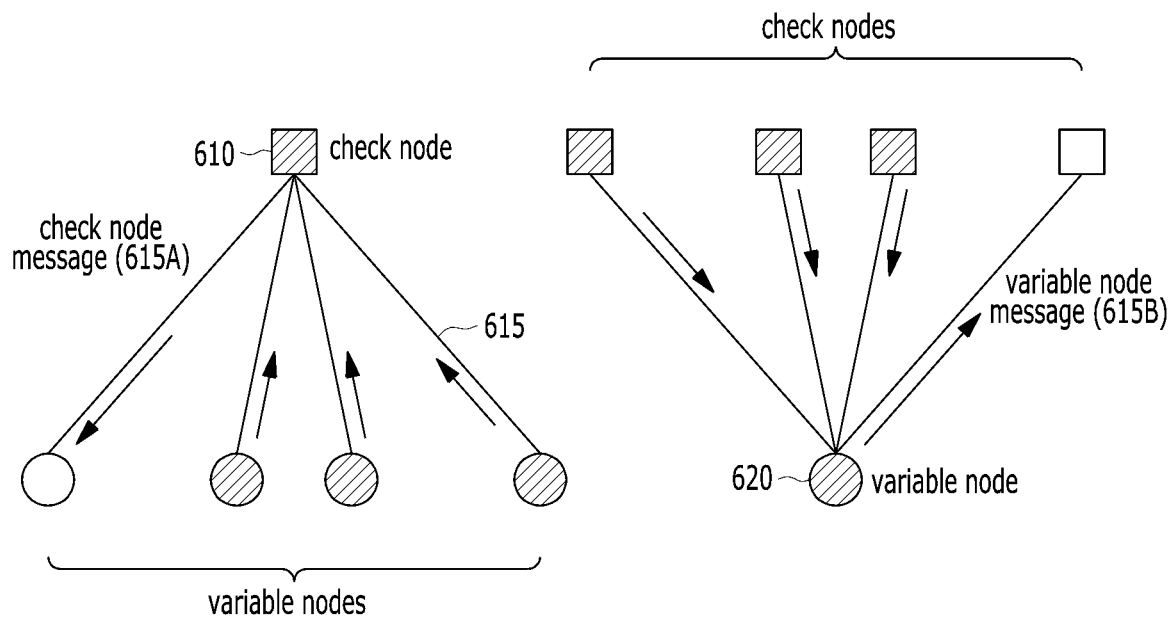
FIG. 6A is a diagram illustrating LDPC decoding represented by a Tanner graph in accordance with an embodiment of the present disclosure.

FIG. 6A is a diagram illustrating LDPC decoding represented by a Tanner graph in accordance with an embodiment of the present disclosure.

Figure 6B:
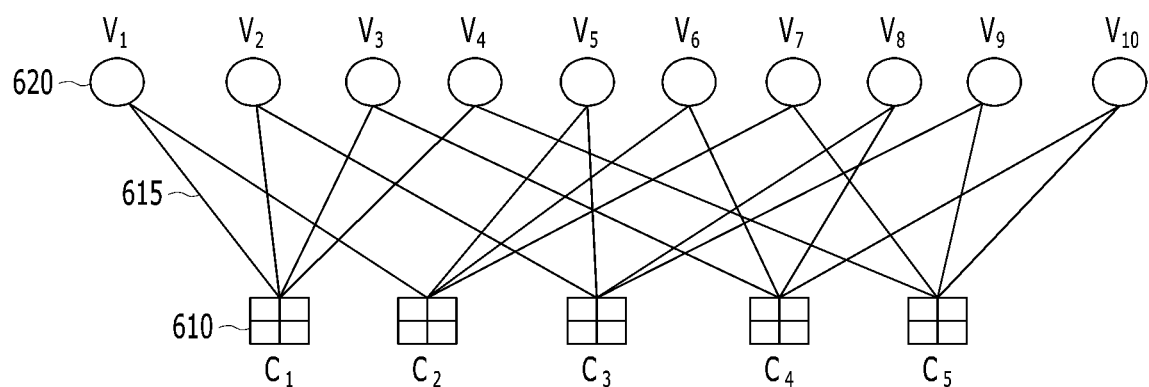
FIG. 6B is a diagram illustrating an LDPC code structure in accordance with an embodiment of the present disclosure.

FIG. 6B is a diagram illustrating an LDPC code structure in accordance with an embodiment of the present disclosure.

FIG. 6C is a diagram illustrating a syndrome check process according to LDPC decoding in accordance with an embodiment of the present disclosure.

An ECC may be commonly used in a storage system. Various physical phenomena occurring in a storage device cause a noise effect that corrupts information stored therein. An error correction coding scheme may be used to protect the stored information from an eventual error. The error correction coding scheme may be performed by encoding information for storage before being stored in a memory device. An encoding process converts a bit sequence of information into a codeword by adding redundancy to the information. The redundancy may be used to recover information from the codeword that is corrupted through a decoding process.

In an iterative coding scheme, a code may be composed of a sequence of several simple constituent codes, and be decoded using an iterative decoding algorithm by exchanging information between constituent decoders of the simple codes. Typically, the code may be defined using a Tanner graph or a bipartite graph that represents the interconnections between constituent codes. In this case, the decoding may be represented as an iterative message passing through a graph edge.

A popular type of an iterative code is a low density parity check (LDPC) code. The LDPC code is a linear binary block code formed by a sparse parity check matrix (H).

Referring to FIG. 6A, the LDPC code is a code with an extremely small number of 1s in each row and column of the parity check matrix defining the code, and the structure thereof may be defined by a Tanner graph including check nodes 610, variable nodes 620, and edges 615 connecting the check nodes 610 and the variable nodes 620. A value transmitted from the check node 610 to the variable node 620 after check node processing is performed is a check node message 615A, and a value transmitted from the variable node 620 to the check node 610 after variable node processing is performed is a variable node message 615B.

For example, referring to FIG. 6B, the Tanner graph of the LDPC code includes five check nodes 610 indicating parity check equations of a predetermined LDPC code, ten variable nodes 620 indicating respective symbols of a codeword, and edges 615 indicating a connection therebetween. The edges 615 may connect the check nodes 610 to the variable nodes 620 according to a parity check matrix. FIG. 6B illustrates a regular LDPC code in which the number of variable nodes connected to each of the check nodes 610 is constantly four, and the number of check nodes connected to each of the variable nodes 620 is constantly two. An initial value of the variable node 620 may be hard decision data or soft decision data.

Referring to FIG. 6C, a parity check matrix H corresponding to the Tanner graph is illustrated. The parity check matrix H is analogous to the graphical representation of parity check equations, and thus an equal number of 1s are present in each column and each row of the parity check matrix H. That is, two 1s in each column of the parity check matrix H indicate the check node 610 connected to each of the variable nodes 620, and four 1s in each row of the parity check matrix H indicate the variable node 620 connected to each of the check nodes 610.

In the LCPC decoding, the process of exchanging messages generated and updated for each node by the variable nodes 620 and the check nodes 610 on the Tanner graph is repeated.

The LDPC decoding for hard decision read data having a predetermined length and read from the memory cell of the memory block 211 by using hard decision read voltage VHD may be composed of a plurality of iterations, each consisting of variable node updating, check node updating and syndrome checking. When a result of the syndrome checking satisfies a predetermined condition after one iteration, the LDPC decoding is terminated, and when the result of the syndrome checking does not satisfy the predetermined condition after the 1 iteration, the 1 iteration consisting of the variable node updating, the check node updating and the syndrome checking is additionally performed. The plurality of iterations are limited to a maximum number of iterations, and when the predetermined condition is not satisfied until the maximum number of iterations is reached, the LDPC decoding for the codeword may be evaluated as a failure.

Referring to FIG. 6C, the syndrome checking is a process of checking whether a result of a product ($Hv^t$) operation of a vector v obtained as a result of the variable node updating and the parity check matrix H satisfies the predetermined condition. When a zero vector "0" is obtained as the result of the product operation, the result of the product operation satisfies the predetermined condition.

FIG. 6C illustrates the syndrome checking process. FIG. 6C illustrates a non-zero vector "01100" as the result of the product operation. Therefore, the syndrome checking illustrated in FIG. 6C does not satisfy the predetermined condition, indicating that the 1 iteration has to be performed again.

In the non-zero vector "01100" as the result of the product operation, the number of non-zero vector elements, that is, the number of elements that do not satisfy a zero vector "0" condition of the syndrome checking is two. In the present specification, an element that does not satisfy the zero vector "0" condition of the syndrome checking for the product operation result of 1 iteration is defined as an unsatisfied syndrome check (USC). FIG. 6C illustrates the result of the syndrome checking in which the number of USCs is two.

Figure 7A:
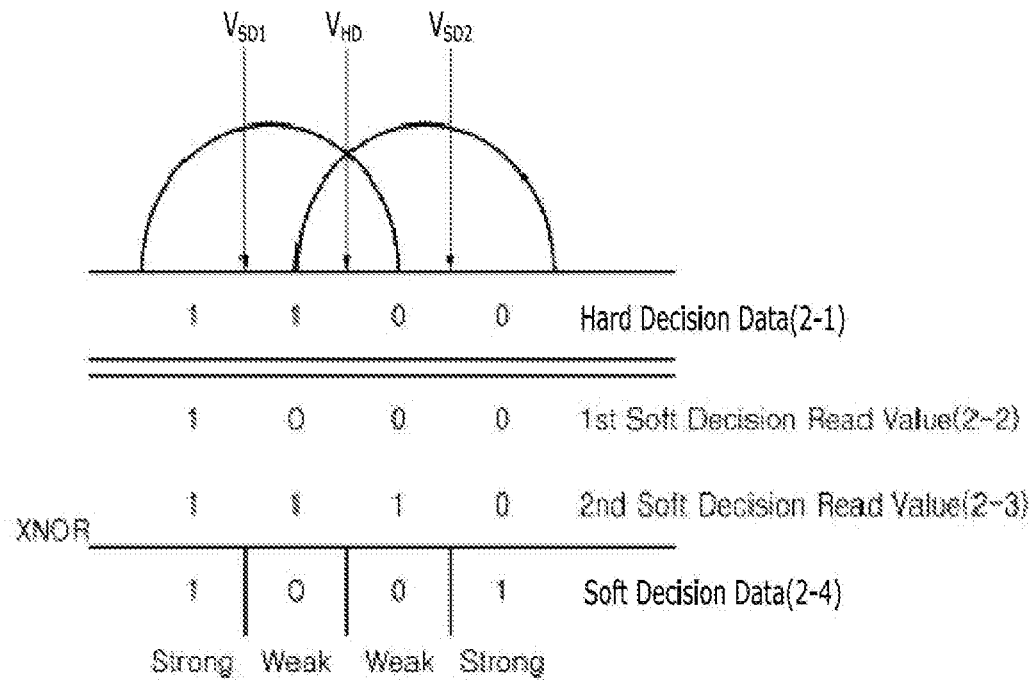
FIG. 7A is a diagram illustrating a 2-bit soft decision read operation as a soft decision read operation illustrated in FIG. 5 in accordance with an embodiment of the present disclosure.
Figure 7B:
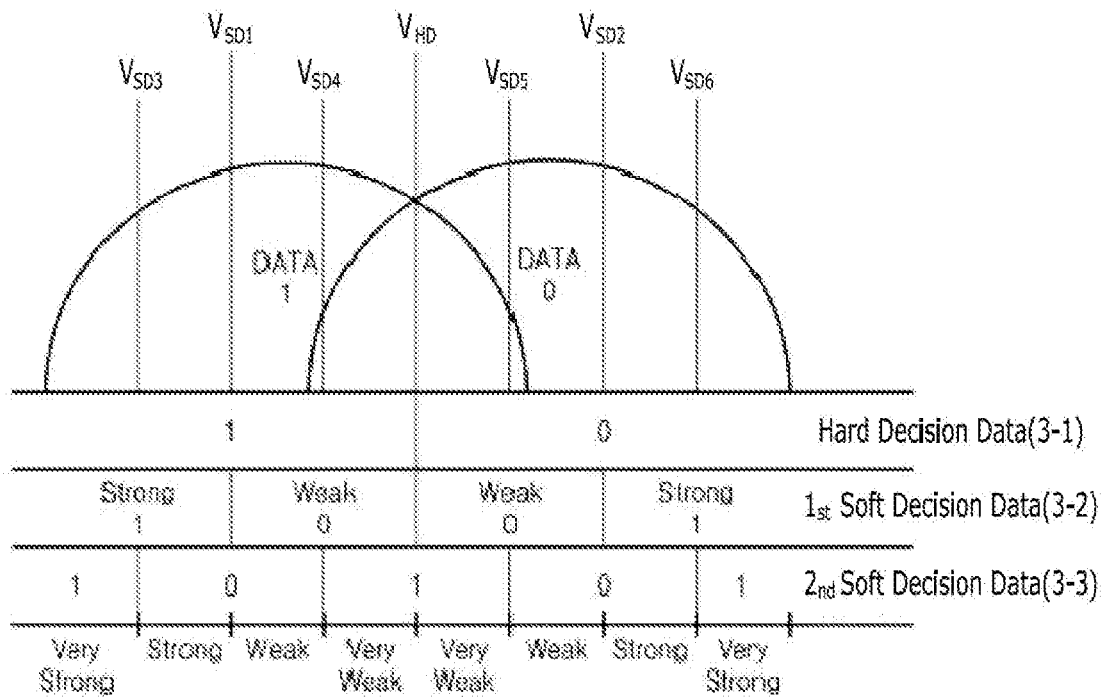
FIG. 7B is a diagram illustrating a 3-bit soft decision read operation as a soft decision read operation illustrated in FIG. 5 in accordance with an embodiment of the present disclosure.

FIG. 7A is a diagram illustrating a 2-bit soft decision read operation as the soft decision read operation illustrated in FIG. 5 in accordance with an embodiment of the present disclosure. FIG. 7B is a conceptual diagram illustrating a 3-bit soft decision read operation as the soft decision read operation illustrated in FIG. 5 in accordance with an embodiment of the present disclosure.

Referring to FIG. 7A, when the hard decision read voltage VHD is applied to a memory cell of the semiconductor memory device 200 in the hard decision decoding operation S510 described with reference to FIG. 5, the hard decision data 2-1 may have a value of 1 or 0 according to an on-off state of the memory cell.

In the soft decision decoding operation S530, through the soft decision read operation, a plurality of soft decision read voltages VSD1 and VSD2 having a constant voltage difference on the basis of the hard decision read voltage VHD may be applied to the memory cell, and thus information that adds reliability to the hard decision read data, that is, an LLR, may be generated.

As illustrated in FIG. 7A, in the case of the 2-bit soft decision read operation, when the first soft decision read voltage VSD1 among the plurality of soft decision read voltages VSD1 and VSD2 is applied to the memory cell, a first soft decision read data value 2-2 may be "1000" according to whether the memory cell is turned on or off. Similarly, a second soft decision read data value 2-3 may be "1110" according to the second soft decision read voltage VSD2 among the plurality of soft decision read voltages VSD1 and VSD2.

For example, the ECC unit 130 may perform an exclusive NOR (XNOR) operation on the first and second soft decision read data values 2-2 and 2-3, and generate soft decision data 2-4, that is, an LLR. The LLR 2-4 may add reliability to the hard decision data 2-1.

For example, "1" of the soft decision data 2-4 may indicate that the hard decision data 2-1 has a strong probability of being in a first state (e.g., "1") or a second state (e.g., "0"), and "0" of the soft decision data 2-4 may indicate that the hard decision data 2-1 has a weak probability of being in the first state (e.g., "1") or the second state (e.g., "0").

Referring to FIG. 7B, when the hard decision read voltage VHD is applied to a memory cell of the semiconductor memory device 200 in the hard decision decoding operation S510 described with reference to FIG. 5, hard decision data 3-1 may have a value of 1 or 0 according to an on-off state of the memory cell.

In the soft decision decoding operation S530, through the soft decision read operation, a plurality of soft decision read voltages VSD1 to VSD6 having a constant voltage difference on the basis of the hard decision read voltage VHD may be applied to the memory cell, and thus information that adds reliability to the hard decision read data, that is, an LLR, may be generated.

As illustrated in FIG. 7B, in the case of the 3-bit soft decision read operation, when the first and second soft decision read voltages VSD1 and VSD2 among the plurality of soft decision read voltages VSD1 to VSD6 are applied to the memory cell, first and second soft decision read data values may be generated as described with reference to FIG. 7A. Subsequently, the XNOR operation may be performed on the first and second soft decision read data values, and thus first soft decision data 3-2 "1001" may be generated.

In addition, when the third to sixth soft decision read voltages VSD3 to VSD6 having a constant voltage difference on the basis of the first and second soft decision read voltages VSD1 and VSD2 are applied to the memory cell, third to sixth soft decision read data values may be generated, similarly to those described with reference to FIG. 7A. Subsequently, the XNOR operation may be performed on the third to sixth soft decision read data values, and thus second soft decision data 3-3, that is, an LLR "10101" may be generated. The LLR 3-3 may assign a weight to the first soft decision data 3-2.

For example, the second soft decision data 3-3 "1" may indicate that the first soft decision data 3-2 has a very strong probability of being in a first state (e.g., "1"), and the second soft decision data 3-3 "0" may indicate that the first soft decision data 3-2 has a strong probability of being in the first state (e.g., "1").

Similarly, the second soft decision data 3-3 "1" may indicate that the first soft decision data 3-2 has a very weak probability of being in a second state (e.g., "0"), and the second soft decision data 3-3 "0" may indicate that the first soft decision data 3-2 has a weak probability of being in the second state (e.g., "0"). In other words, similarly to that described with reference to FIG. 7A, the LLR 3-3 may add more reliability to the hard decision data 3-1.

Data read from the semiconductor memory device 200 may include at least one codeword. For example, the memory controller 100 may read data in units of pages from the semiconductor memory device 200, and the data in units of pages may include one codeword.

Figure 8:
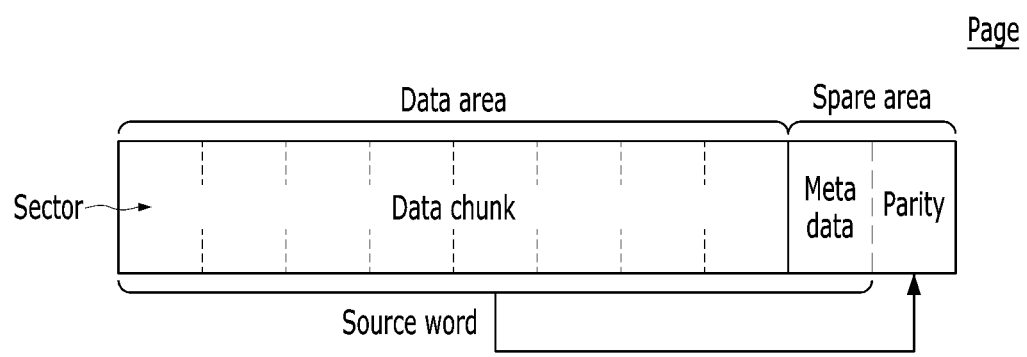
FIG. 8 illustrates data stored in a page of a semiconductor memory device in accordance with an embodiment of the present disclosure.

FIG. 8 illustrates data stored in a page of the semiconductor memory device 200 in accordance with an embodiment of the present disclosure.

One page may include a data area and a spare area. The data area may store user data, and the spare area may store meta data and a parity corresponding to the user data.

Data stored in one data area may be referred to as a data chunk. The memory controller 100 may store, in the storage unit 110, user data received from the host or user data obtained from the semiconductor memory device 200. The memory controller 100 may generate a data chunk by using the user data stored in the storage unit 110. The memory controller 100 may generate meta data associated with the data chunk. The ECC encoder 131 may generate a parity by performing error correction encoding on the data chunk and the meta data as source words. The memory controller 100 may control the semiconductor memory device 200 to program the data chunk, the meta data and the parity into a page.

The data area may be divided into a plurality of sectors. One sector may correspond to a logical block address (LBA) used in the file system of the host, and store therein user data of a minimum unit, which is exchanged between the host and the semiconductor memory system 10. For example, when the size of one sector is 512 bytes and the size of the data area is 4 KB, one data area may be divided into 8 sectors. That is, one page may store user data corresponding to the size of 8 sectors.

There may be a case that the memory controller 100 stores, in one page, user data having a size smaller than the size of the data area. For example, when the memory controller 100 receives a flush command from the host in a state where user data corresponding to 6 sectors is buffered in the storage unit 110, the memory controller 100 may store the user data corresponding to the 6 sectors in the data area. When only the user data corresponding to the 6 sectors is stored in the data area, the remaining 2 sectors may be wasted in the data area of the page.

Hereinafter, a method of improving the reliability of user data by using a sector of the data area remaining after the user data is stored is proposed. An embodiment of the present disclosure is described in detail with reference to FIGS. 9 to 12.

Figure 9:
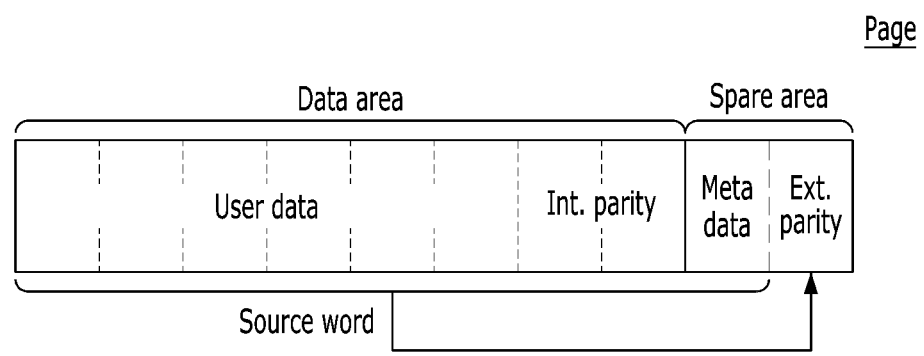
FIG. 9 illustrates data that may be stored in a page in accordance with an embodiment of the present disclosure.

FIG. 9 illustrates data that may be stored in a page in accordance with an embodiment of the present disclosure.

When the size of user data to be programmed in one page is smaller than the size of the data area, the memory controller 100 may generate an additional parity for the user data, and configure a single data chunk full of the user data and the additional parity. Hereinafter, a parity included in the spare area may be referred to as an external parity (Ext. parity), and the additional parity included in the data area may be referred to as an internal parity (Int. parity).

The ECC encoder 131 may generate an internal parity by performing first ECC encoding on the user data. The size of the internal parity may be determined according to the size of user data and the size of the data area. For example, when the user data occupies 6 sectors in the data area, the size of the internal parity may correspond to the size of 2 sectors. The ECC encoder 131 may support the first ECC encoding having various encoding rates to generate the internal parity having different sizes according to the size of the user data and the size of the data area. The user data and the internal parity may configure a single data chunk of a full size and corresponding to the data area. That is, one data chunk may be full of the user data and the internal parity.

Depending on an implementation, before the first ECC encoding is performed on the user data, the memory controller 100 may scramble the user data. The memory controller 100 may further include a scrambler (not illustrated) that can scramble and descramble data.

The CPU 120 may generate meta data corresponding to the user data. The meta data may include location information of the user data within the data chunk. The location information may indicate one or more sectors where the user data is located within the data chunk or the data area. For example, the location information may include a bitmap indicating sectors where the user data is located within the data chunk or the data area. The memory controller 100 may identify locations of the user data and the internal parity within the data chunk or the data area through the bitmap indicating the sectors of the data chunk or the data area.

The ECC encoder 131 may generate the external parity by performing second ECC encoding using the data chunk and meta data as source words. The meta data and external parity may be stored in the spare area.

According to an embodiment, when the size of the user data is smaller than the size of the data area, the memory controller 100 may perform a double parity operation on the user data to generate internal and external parities and store the internal parity and the external parity corresponding to the user data in one page. Even when the first ECC decoding fails using the external parity of data read from the page, the ECC decoder 133 may obtain error-free user data by trying to perform the second ECC decoding using the internal parity. Accordingly, since the memory controller 100 may provide the host with the error-free user data, the reliability of the semiconductor memory system 10 may be improved.

Figure 10:
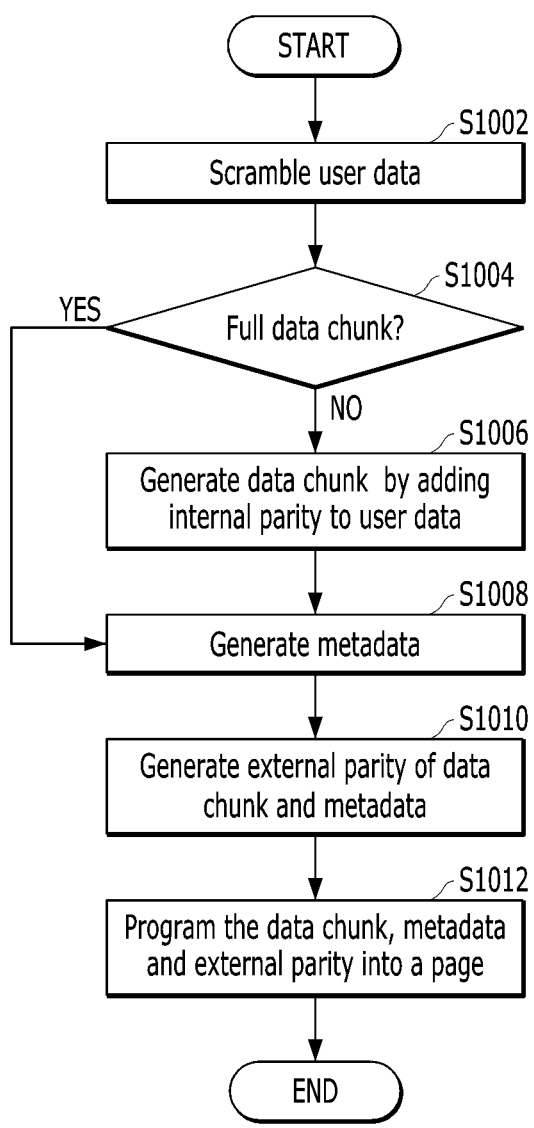
FIG. 10 is a flowchart illustrating a write operation of a memory controller in accordance with an embodiment of the present disclosure.

FIG. 10 is a flowchart illustrating a write operation of the memory controller 100 in accordance with an embodiment of the present disclosure.

In operation S1002, the scrambler may scramble user data buffered in the storage unit 110, to program the user data into a page.

In operation S1004, the CPU 120 may determine whether the size of the user data corresponds to a full size of a data chunk.

When the size of the user data is smaller than the size of the data chunk (that is, "NO" in operation S1004), the ECC encoder 131 may generate the data chunk full of the user data and an internal parity generated by performing the first ECC encoding on the user data, in step S1006.

In operation S1008, the CPU 120 may generate meta data for the user data. The meta data may include location information of the user data within the data chunk. The CPU 120 may generate map data that maps a physical address of the page and a logical address of the user data and store the map data in the storage unit 110.

In operation S1010, the ECC encoder 131 may generate an external parity by performing the second ECC encoding on the data chunk and the meta data. That is, when the size of the user data is smaller than the size of the data chunk, the internal parity and external parity may be generated for the user data.

When the size of the user data is the same as the size of the data chunk (that is, "YES" in operation S1004), the CPU 120 may perform the operation S1008. That is, the CPU 120 may generate the meta data without generating the internal parity for the user data. The meta data may include location information of the user data. When the size of the user data is the same as the size of the data chunk, the location information may indicate information that the user data are included in all sectors of a data area.

In operation S1010, the ECC encoder 131 may generate the external parity by performing the second ECC encoding on the data chunk and the meta data. That is, when the size of the user data is the same as the size of the data chunk, only the external parity may be generated for the user data.

In operation S1012, the CPU 120 may control the semiconductor memory device 200 to store in the page, the page chunk including the data chunk, the meta data and the external parity.

Figure 11:
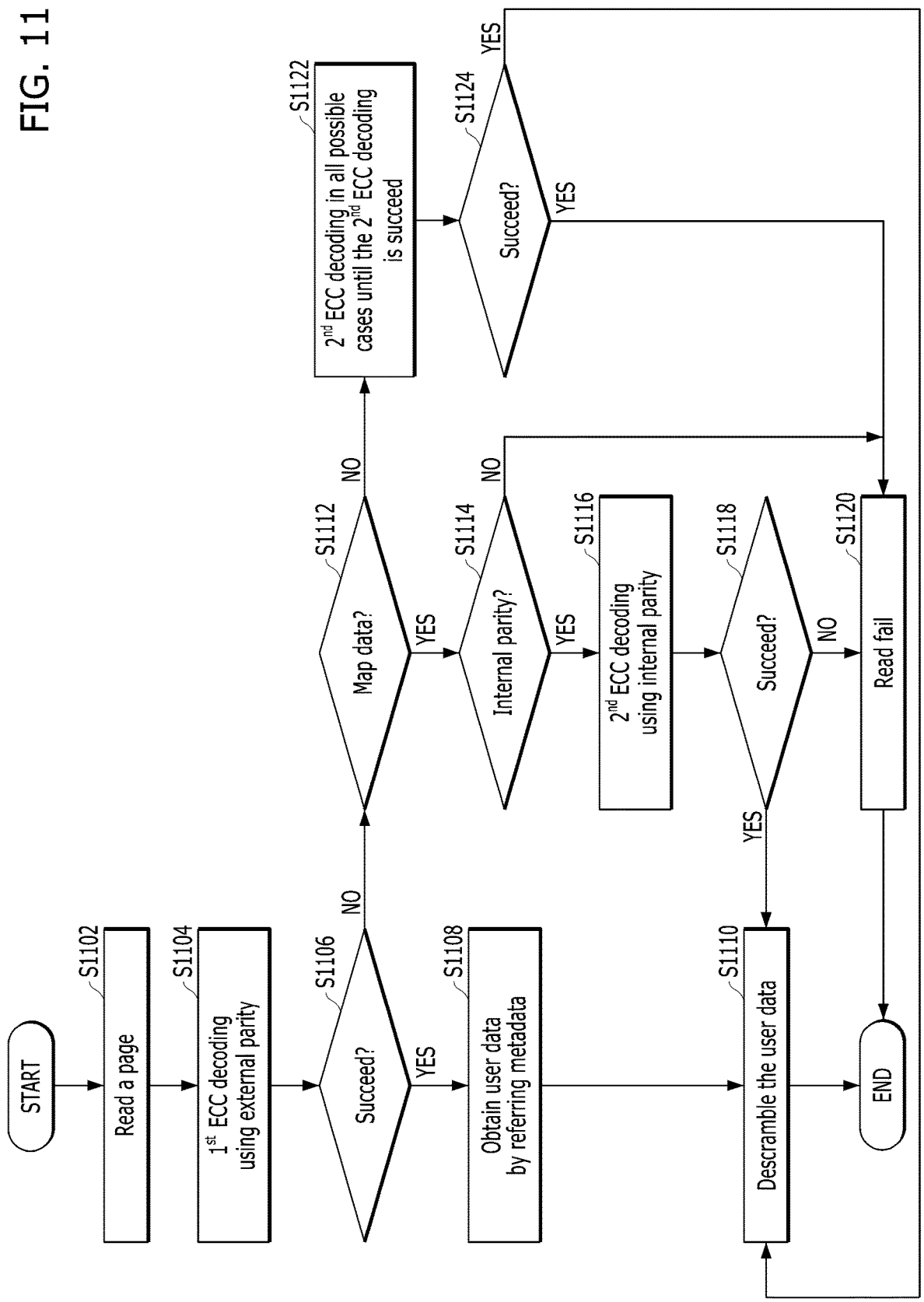
FIG. 11 is a flowchart illustrating a read operation of a memory controller in accordance with an embodiment of the present disclosure.

FIG. 11 is a flowchart illustrating a read operation of the memory controller 100 in accordance with an embodiment of the present disclosure.

In operation S1102, the CPU 120 may control the semiconductor memory device 200 to read a page chunk from a page.

In operation S1104, the ECC decoder 133 may perform first ECC decoding on a data chunk and meta data included in the read page chunk by using an external parity included in the read page chunk.

In operation S1106, the ECC decoder 133 may determine whether the first ECC decoding succeeds.

When the first ECC decoding succeeds (that is, "YES" in operation S1106), the CPU 120 may obtain user data included in the read page chunk by referring to the meta data included in the read page chunk, in operation S1108. Specifically, when the ECC decoder 133 succeeds in the first ECC decoding, the CPU 120 may obtain an error-free data chunk and the meta data from the read page chunk. The CPU 120 may obtain the user data from the data chunk with reference to the meta data included in the read page chunk. The obtained user data may be the user data scrambled in operation S1002.

In operation S1110, the scrambler may descramble the user data. The descrambled data may be outputted to the host or used inside the semiconductor memory system 10.

When the first ECC decoding fails (that is, "NO" in operation S1106), the data chunk and meta data included in the read page chunk is unreliable. When the meta data is unreliable data, it is difficult for the memory controller 100 to obtain accurate location information of the user data from the meta data.

In order to obtain the location information of the user data, the CPU 120 may determine whether map data associated with the page is stored in the storage unit 110, in operation S1112.

When the map data associated with the page is stored (that is, "YES" in operation S1112), the CPU 120 may determine whether the data chunk included in the read page chunk includes an internal parity, with reference to the map data in operation S1114.

When the data chunk included in the read page chunk does not include the internal parity and includes only the user data (that is, "NO" in operation S1114), the CPU 120 may determine that the read operation has failed, in operation S1120, and end the read operation.

When the data chunk included in the read page chunk includes the internal parity (that is, "YES" in operation S1114), the ECC decoder 133 may perform second ECC decoding using the internal parity included in the read page chunk in operation S1116.

In operation S1118, the ECC decoder 133 may determine whether the second ECC decoding succeeds.

When the second ECC decoding succeeds (that is, "YES" in operation S1118), the CPU 120 may obtain error-free user data from the read page chunk. The scrambler may descramble the user data in operation S1110.

When the second ECC decoding fails (that is, "NO" in operation S1118), the CPU 120 may determine that the read operation has failed, in operation S1120, and end the read operation.

When the map data associated with the page is not stored (that is, "NO" in operation S1112), it is difficult to know the location information of the user data and internal parity in the data chunk. Accordingly, in operation S1122, the ECC decoder 133 may perform the second ECC decoding for all possible cases until the second ECC decoding succeeds. All possible cases may refer to all combinations of the user data and the internal parity in the data chunk.

Figure 12:
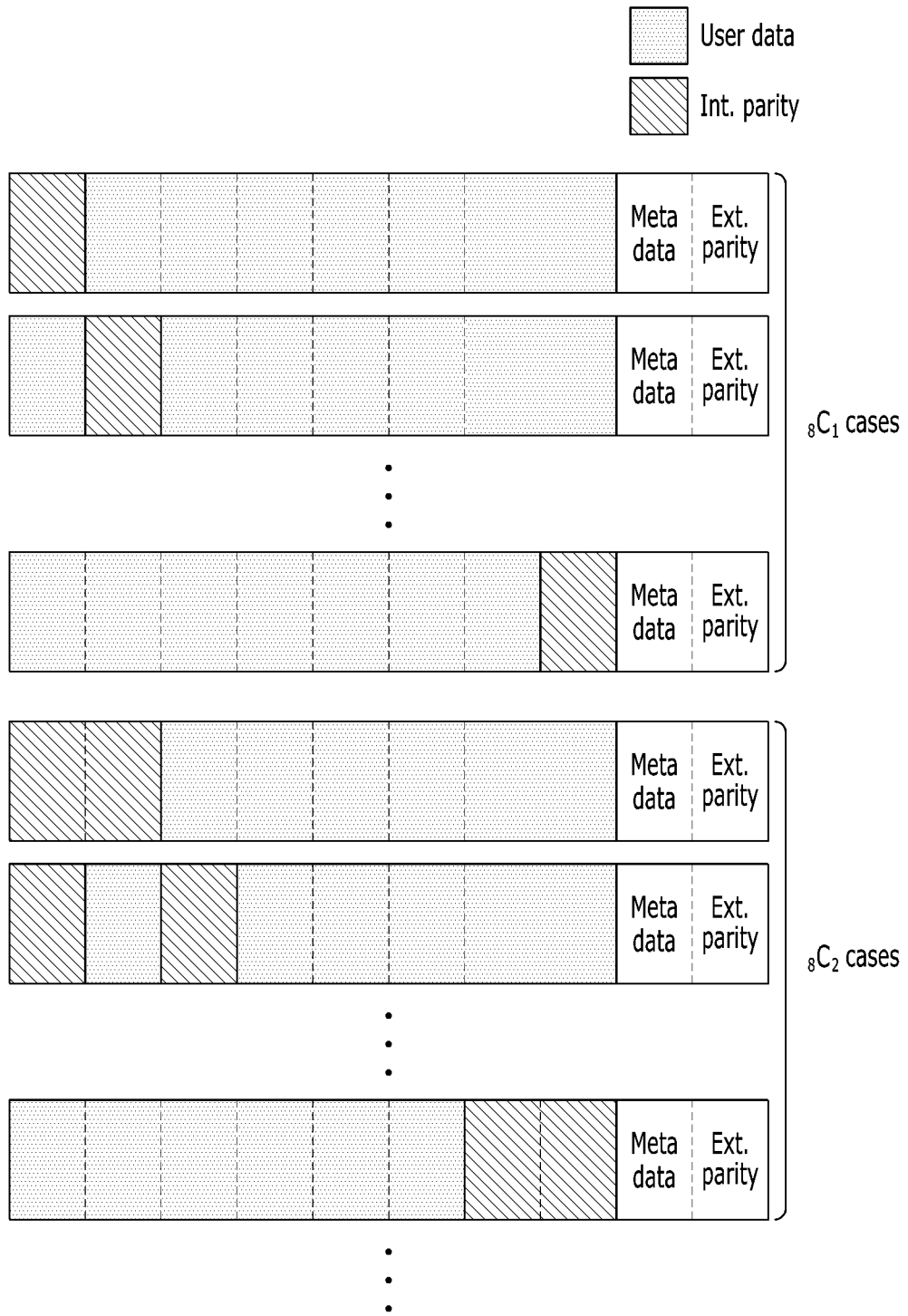
FIG. 12 is a detailed diagram illustrating the read operation of the memory controller illustrated in FIG. 11 in accordance with an embodiment of the present disclosure.

FIG. 12 is a detailed diagram illustrating the operation S1122 illustrated in FIG. 11.

FIG. 12 illustrates some of possible combinations of user data and an internal parity in a page. In FIG. 12, a dot pattern indicates a sector in which the user data is stored, and a hatched pattern indicates a sector in which the internal parity is stored.

The ECC decoder 133 may assume that the number of internal parities is 1, and perform the second ECC decoding. Referring to FIG. 12, a case where the number of internal parities is 1 is $_8C_1=8$ cases.

For example, the ECC decoder 133 may assume that data of a first sector is the internal parity, and perform the second ECC decoding on data of the other sectors. When the second ECC decoding fails, the ECC decoder 133 may assume that data of a second sector as the internal parity, and perform the second ECC decoding on the other sectors.

When the second ECC decoding fails in all cases where the number of internal parities is 1, the ECC decoder 133 may assume that the number of internal parities is 2, and perform the second ECC decoding. Referring to FIG. 12, a case where the number of internal parities is 2 is $_8C_2=28$ cases.

When the second ECC decoding fails in all cases where the number of internal parities is 2, the ECC decoder 133 may sequentially perform the second ECC decoding on a case where the number of internal parities is 3 to a case where the number of internal parities is 7.

The ECC decoder 133 may repeatedly perform the second ECC decoding until the second ECC decoding succeeds in operation S1122 or until the second ECC decoding on all possible cases fails.

Referring back to FIG. 11, in operation S1124, the ECC decoder 133 may determine whether the second ECC decoding succeeds in operation S1122.

When the second ECC decoding succeeds (that is, "YES" in operation S1124), the CPU 120 may obtain error-free user data from the read page chunk. The scrambler may descramble the user data in operation S1110.

When the second ECC decoding fails (that is, "NO" in operation S1124), the CPU 120 may determine that the read operation has failed in operation S1120, and end the read operation.

According to an embodiment, when the size of user data to be programmed in one page is smaller than the size of a data area, the memory controller 100 may generate an internal parity by performing first ECC encoding on the user data. The memory controller 100 may generate meta data corresponding to the user data. The memory controller 100 may generate an external parity by performing second ECC encoding using the user data, the internal parity and the meta data as source words. The memory controller 100 may control the semiconductor memory device 200 to store the user data and the internal parity in the data area and store the meta data and the external parity in a spare area.

According to an embodiment, the memory controller 100 may improve the success rate of the read operation by storing an internal parity in a spare area remaining after storing user data in a data area. Accordingly, reliability and performance of the semiconductor memory system 10 may be improved.

Embodiments of the present disclosure may provide a controller and an operating method thereof, which may accurately read data stored in a memory cell.

Although a controller and an operating method thereof have been described with reference to the specific embodiments, these are merely examples, and the present disclosure is not limited thereto, and should be interpreted to have the widest scope according to the basic concepts disclosed in the present specification. Those skilled in the art may carry out unspecified embodiments by combining and substituting the disclosed embodiments, but these also do not depart from the scope of the present disclosure. In addition, those skilled in the art may easily change or modify the embodiments disclosed based on the present specification, and it is apparent that such changes or modifications also fall within the scope of the present disclosure and the following claims. Furthermore, the embodiments may be combined to form additional embodiments.

What is claimed is:

1. An operating method of a controller that controls a memory device, the operating method comprising:
   generating a data chunk including user data to be programmed in a page of the memory device and an internal parity generated by performing first ECC encoding on the user data, the internal parity being generated when a size of the user data is smaller than a size of a data area of the page;
   generating a page chunk including the data chunk, meta data of the user data and an external parity generated by performing second ECC encoding on the meta data and the data chunk; and
   controlling the memory device to program the page chunk into the page.

2. The operating method of claim 1, wherein the meta data indicates a location of the user data in the data area.

3. The operating method of claim 2, further comprising:
   controlling the memory device to read the page chunk from the page;
   performing first ECC decoding on the data chunk and the meta data included in the read page chunk by using the external parity included in the read page chunk; and
   obtaining the user data from the data chunk included in the read page chunk on the basis of the meta data when the first ECC decoding succeeds.

4. The operating method of claim 1, further comprising storing, in a memory included in the controller, map data indicating a physical address and a logical address of the user data.

5. The operating method of claim 4, further comprising:
   controlling the memory device to read the page chunk from the page;
   performing first ECC decoding on the data chunk and the meta data included in the read page chunk by using the external parity included in the read page chunk;
   identifying the user data and the internal parity in the data chunk included in the read page chunk by referring to the map data corresponding to the user data when the first ECC decoding fails; and
   performing second ECC decoding on the user data included in the read page chunk by using the internal parity included in the read page chunk.

6. The operating method of claim 5, further comprising determining that a read operation on the page has failed when the data chunk has no internal parity as a result of the identifying.

7. The operating method of claim 5, further comprising, when there is no map data corresponding to the user data, repeatedly performing the second ECC decoding on any combination of the user data and the internal parity in the data chunk included in the read page chunk until the second ECC decoding succeeds or on all possible combinations of the user data and the internal parity in the data chunk included in the read page chunk until the second ECC decoding fails.

8. The operating method of claim 1, wherein the generating of the data chunk includes:
   determining an encoding rate of the first ECC encoding according to the size of the user data; and
   generating the internal parity by performing the first ECC encoding on the user data according to the determined encoding rate.

9. The operating method of claim 8, wherein the generating of the data chunk further includes scrambling the user data before generating the internal parity.

10. The operating method of claim 1, further comprising determining the user data as the data chunk to be stored in the data area when the size of the user data is the same as the size of the data area.

11. A controller that controls a memory device, the controller comprising:
   an ECC encoder configured to:
   generate a data chunk including user data to be programmed in a page of the memory device and an internal parity generated by performing first ECC encoding on the user data, the internal parity being generated when a size of the user data is smaller than a size of a data area of the page, and
   generate a page chunk including the data chunk, meta data of the user data and an external parity generated by performing second ECC encoding on the meta data and the data chunk; and
   a processor configured to control the memory device to program the page chunk into the page.

12. The controller of claim 11, wherein the meta data indicates a location of the user data in the data area.

13. The controller of claim 12,
   wherein the processor is further configured to control the memory device to read the page chunk from the page,
   further comprising an ECC decoder configured to perform first ECC decoding on the data chunk and the meta data included in the read page chunk by using the external parity included in the read page chunk, and
   wherein the processor is further configured to obtain the user data from the data chunk included in the read page chunk on the basis of the meta data when the first ECC decoding succeeds.

14. The controller of claim 11, further comprising a memory configured to store therein map data indicating a physical address and a logical address of the user data.

15. The controller of claim 14,
   wherein the processor is further configured to control the memory device to read the page chunk from the page, and
   further comprising an ECC decoder configured to:
   perform first ECC decoding on the data chunk and the meta data included in the read page chunk by using the external parity included in the read page chunk,
   identify the user data and the internal parity in the data chunk included in the read page chunk by referring to the map data corresponding to the user data when the first ECC decoding fails, and
   perform second ECC decoding on the user data included in the read page chunk by using the internal parity included in the read page chunk.

16. The controller of claim 15, wherein the processor is further configured to determine that a read operation on the page has failed when the data chunk has no internal parity as a result of the identifying.

17. The controller of claim 15, wherein the ECC decoder is further configured to repeatedly perform, when there is no map data corresponding to the user data, the second ECC decoding on any combination of the user data and the internal parity in the data chunk included in the read page chunk until the second ECC decoding succeeds or on all possible combinations of the user data and the internal parity in the data chunk included in the read page chunk until the second ECC decoding fails.

18. The controller of claim 11, wherein the ECC encoder generates the data chunk by:
   determining an encoding rate of the first ECC encoding according to the size of the user data, and
   generating the internal parity by performing the first ECC encoding on the user data according to the determined encoding rate.

19. The controller of claim 18, wherein the controller further includes a scrambler configured to scramble the user data before the ECC encoder generates the internal parity.

20. The controller of claim 11, wherein the processor is further configured to determine the user data as the data chunk to be stored in the data area when the size of the user data is the same as the size of the data area.

* * * * *